United States Patent [19]
Leidig et al.

[11] Patent Number: 5,486,895
[45] Date of Patent: Jan. 23, 1996

[54] OPTICAL SYSTEM FOR PRINTING NORMAL AND PANORAMIC IMAGES

[75] Inventors: Carl F. Leidig; Lee R. Estelle, both of Rochester; William E. Moore, II, Fairport, all of N.Y.

[73] Assignee: Eastman Kodak Company, Rochester, N.Y.

[21] Appl. No.: 231,418

[22] Filed: Apr. 22, 1994

[51] Int. Cl.⁶ .................................................. G03B 27/52
[52] U.S. Cl. ............................... 355/50; 355/43; 355/57; 355/60; 355/66
[58] Field of Search .................................. 355/43, 57, 60, 355/66, 50

[56] References Cited

U.S. PATENT DOCUMENTS

| | | | |
|---|---|---|---|
| 1,801,450 | 4/1931 | Owens | 355/43 |
| 2,974,573 | 3/1961 | Faasch | 355/60 |
| 3,424,527 | 1/1969 | Bremson, Jr. | 355/19 |
| 3,604,791 | 9/1971 | Baltatu | 355/43 |
| 4,531,831 | 6/1985 | Katajima et al. | 355/57 |
| 4,791,456 | 12/1988 | Hope et al. | 355/28 |
| 4,961,093 | 10/1990 | McDonald | 355/60 X |
| 5,028,128 | 7/1991 | Onuki | 353/82 |
| 5,162,843 | 11/1992 | Clapp | 355/46 |
| 5,289,229 | 2/1994 | Manico et al. | 355/41 |

OTHER PUBLICATIONS

Noritsu brochure "Introducing the QSS–1912. What Everyone Else Will Think of Next", distributed at PMA, 1994.

*Primary Examiner*—Michael L. Gellner
*Assistant Examiner*—D. P. Malley
*Attorney, Agent, or Firm*—Joseph F. Breimayer

[57] ABSTRACT

An automatic printer for making prints of normal and panoramic format negative filmstrip image frames arbitrarily interspersed in a single filmstrip. Normal and panoramic projection systems are provided for projecting normal and panoramic images onto respective projection planes of the photographic print paper. Normal and panoramic format image frames are distinguished, and the appropriate projection system is employed through the insertion or withdrawal of a first reflective mirror into the projection path of the image bearing light beam. Zoom lens systems in each projection system are set to the appropriate magnifications for the width of print paper employed. The panoramic projection system employs a precision variable conjugate controlled zoom lens in association with a second movable mirror to adjust object plane to image plane distance to avoid overlap of the normal and panoramic projection planes at each magnification for each paper width.

24 Claims, 5 Drawing Sheets

OPTICAL SYSTEM FOR PRINTING NORMAL AND PANORAMIC IMAGES

FIELD OF THE INVENTION

The invention relates to the field of photographic printers, and particularly to automatic printers for making prints of normal and panoramic image frames arbitrarily interspersed in a single filmstrip advanced through the print gate.

BACKGROUND OF THE INVENTION

Automated photographic printers for making positive paper prints from image frames of processed negative filmstrips are well known in the photographic art. Most automated printers have a film transport mechanism for stepwise advancing the filmstrip an image frame at a time from a supply reel to a take-up reel or the like and through an image frame sized scanning gate and an exposure gate at a high speed. In the scanning gate, the density and color balance of the negative may be automatically read out, and exposure parameters may be calculated and stored in memory until the same image frame is advanced into the exposure gate. The KODAK® CLAS 35 color printer is an example of such an automated, high speed printer for printing filmstrip image frames of the same size and format.

Cameras are now being developed by Eastman Kodak Company and other manufacturers to allow the photographer to selectively make either a first or "normal" (N) format exposure of a scene or a wider, second or "panoramic" (P) format exposure on a roll of 35 mm film at any time. One type of camera is provided with interchangeable normal and wide angle lens systems that focus either a normal width scene or a wide angle scene as an image captured on the same standard size filmstrip image frame, depending on the lens system selected by the photographer. With the camera held in the normal, horizontal alignment, the wide angle scene is focused down and exposed centrally, in the filmstrip width direction, in the image frame and extends along the length of the standard 35 mm image frame, leaving equal sized, unexposed, strip areas (normally occupied by the N format image) above and below the P format exposure.

The resulting exposed filmstrip may have N and P format image frames 15 and 17, respectively, interspersed randomly through its length as in the filmstrip 10 depicted in FIG. 1. The depicted segment of filmstrip 10 includes image frame numbered 1–5 along the edge of the filmstrip that are alternatively exposed as N format image frames 15 and P format image frames 17. As can be seen in FIG. 1, the filmstrip 10 conforms to the 35 mm film standard. The image frame numbers 1–5 all have the standard 35 mm length, but differ in width. Image frame numbers 2 and 4 are centered in the filmstrip width but foreshortened to about half the normal image frame width in the P format.

In commonly assigned U.S. Pat. No. 5,220,378, an optical arrangement for a high speed printer for providing multiple magnifications of a filmstrip image frame on the photographic paper is disclosed. The optical arrangement employs up to three fixed lens elements that are positioned with respect to sets of fixed mirrors and selectively positionable mirrors to expose prints selectively on up to three widths of print paper. The print paper has a fixed edge alignment with the paper transport path, and the movable mirrors are positioned selectively by a carriage to pass or reflect the image in up to three magnifications on the three paper sizes. Alternatively, the optical arrangement may be employed with the widest width paper to provide images of selected magnifications on the same paper. In either case, the magnifications of the selected images are made in both dimensions on the paper, since the image is projected to center on the paper at the center point in the width direction, regardless of the magnification.

If the optical arrangement of the '378 patent were used to print both N and P format images on the same photographic paper width, it would be presumed that the high magnification lens and mirror arrangement would be used to magnify the P format image so that the projected image would be widened to the width of the paper, thereby magnifying the length of the image projected on the paper in both directions from the imaging center point. The paper transport would have to be dependent on the detected P or N format of the filmstrip image frame to advance the photographic paper the appropriate distance from the edge of the preceding exposure frame before the image is projected.

The difficulty with this approach lies in the number of fixed focal length lenses and mirrors required to both accommodate P and N format image frames and differing width photographic paper. Photographic paper widths that may be employed in the CLAS 35 printer are typically 3.5, 4.0 and 5.0 inches. In the CLAS 35 printer, a zoom lens is employed to expand or contract the image projected into the single projection plane to fit the paper width installed.

Problems to be Solved by the Invention

There is a need therefore for a reliable, high print quality and high operating speed printer for selectively printing N and P format prints on a variety of paper widths. The need for such a printer will increase as the number of cameras permitting dual or multiple format image frame sizes proliferate in the marketplace.

SUMMARY OF THE INVENTION

It is therefore an object of the present invention to effect the rapid change of magnification in a high speed photo finishing printer between two different discrete magnifications for a variety of paper widths utilizing a single exposure gate and a minimum number of lens systems.

It is a further object of the present invention to provide for printing N and P format filmstrip image frames on such a variety of paper widths employing a minimum number of optical paths and lens systems.

It is a still further object of the present invention to efficiently print N and P format image frames on the same printer in the same sequence that the image frames appear in the filmstrip or in separate passes of the negative filmstrips through the printer exposure gate.

In regard to positioning a second format, adjustable magnification, optical system into the image bearing light beam the printer and method of printing preferably further comprises means for and steps of: selectively positioning a first reflective mirror into the image bearing light beam to reflect the light beam into a second projection path; positioning an adjustable magnification zoom lens system in the second projection path for selectively magnifying the projected light image in the second projection path; positioning a second reflective mirror in the second projection path in relation to the adjustable magnification zoom lens system for reflecting the magnified light image onto the second projection plane; and the adjusting means for and step further comprises: adjusting the magnification of the zoom lens system in the second projection path for selectively magnifying the reflected light image to the selected photographic print paper width; and adjusting the position of the second reflective mirror in the second projection path for adjusting the length of the second projection path to maintain the first and second format projection plane length boundaries in substantial coincidence.

The printer is adapted to operate with a variety of print paper widths through means for and the steps of:

selecting the width of the elongated photographic print paper; and adjusting the first and second format image frame magnifications, so that the first and second format projection planes are aligned to the selected width of the photographic print paper and the first and second projection plane length boundaries substantially coincide.

In a further aspect of the invention, different width size photographic paper is accommodated through the use of a "Precision Variable Conjugate Controlled" (PVCC) zoom lens for the second lens system. The first zoom lens is the "N" lens for imaging the first or N format on the first magnification or N projection plane, and the second zoom lens is the "P" lens for imaging the second or P format on the second magnification or P projection plane on the photographic paper.

Advantageous Effects of the Invention

In the first aspect of the invention, only one relatively small and easy to move lightweight mirror, that is moved into the light beam for making exposures of P format image frames, is used along with the two zoom lenses for the two separate magnifications required for N and P formats. In accordance with the second aspect of the invention, the more infrequent adjustment to a new paper width is easily accomplished using the motor driven second reflective mirror in the second projection path.

The zoom ranges of the first and second zoom lens systems required to zoom between paper width sizes are small, and consequently easy to design and reliable. Reliability is enhanced by the fact that the adjustments are only necessary at relatively infrequent paper changes. The actual focus and magnifications achieved by lens system and mirror position adjustment at each paper change may be visually confirmed and are unlikely to change between paper changes.

The longer overall object-to-image-distance of the PVCC zoom lens system keeps the field coverage of the P lens to a minimum while at the same time reducing the number of different masking and punching positions required at the paper plane. The use of the PVCC zoom lens at the second lens position also allows more room for the placement of the second reflective mirror in the short conjugate of the lens.

BRIEF DESCRIPTION OF THE DRAWINGS

Other objects, advantages and features of the present invention will become apparent from the following specification when taken in conjunction with the accompanying drawings in which like elements are commonly enumerated and in which.

The drawings are not necessarily to scale.

DETAILED DESCRIPTION OF THE PREFERRED EMBODIMENTS

Figure 2:
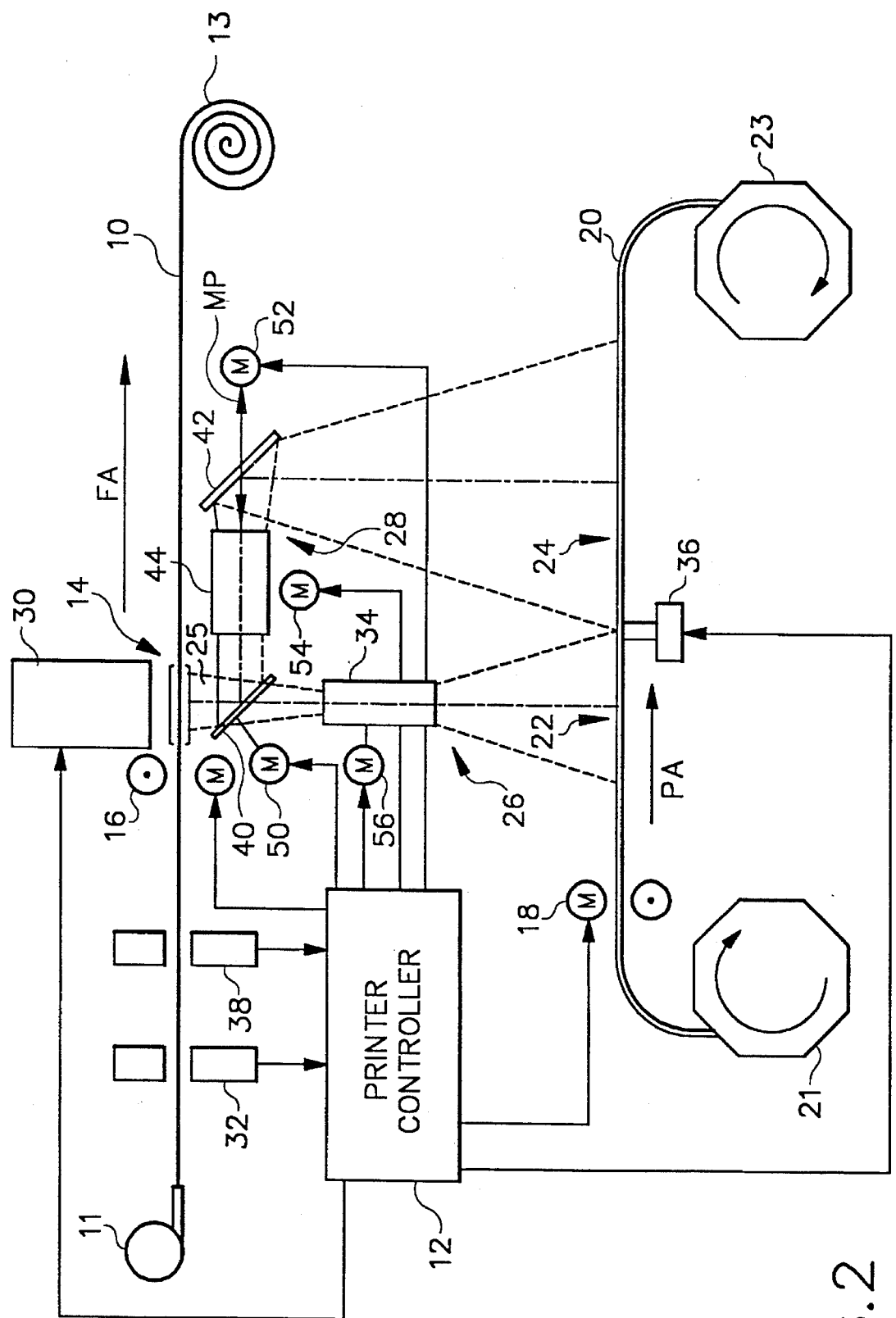
FIG. 2 is a diagrammatic view of the components of the high speed photographic printer of the present invention for printing either N or P format filmstrip image frames.
Figure 3:
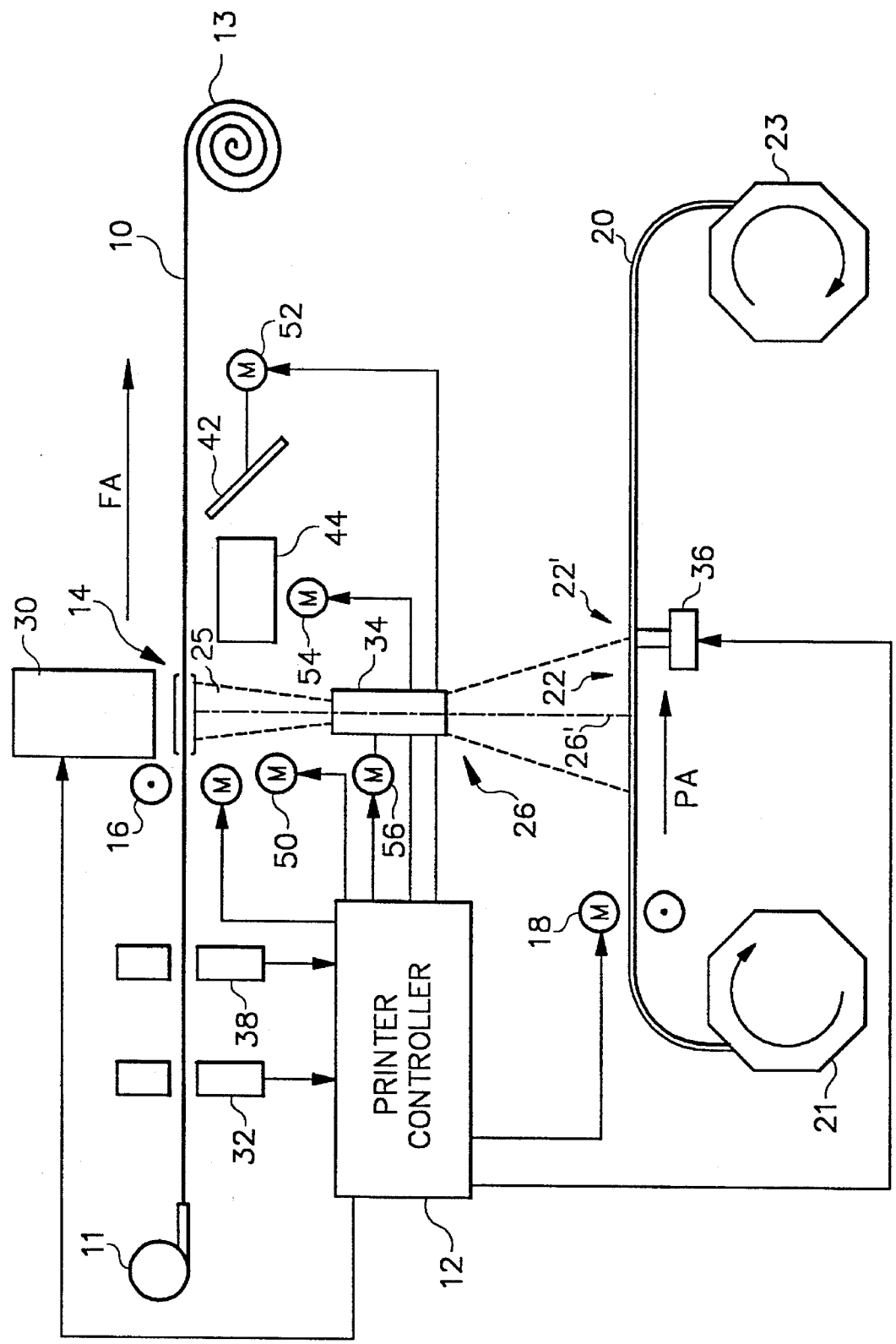
FIG. 3 is a diagrammatic view of the printer of FIG. 2 in the operating position for printing N format filmstrip image frames.
Figure 4:
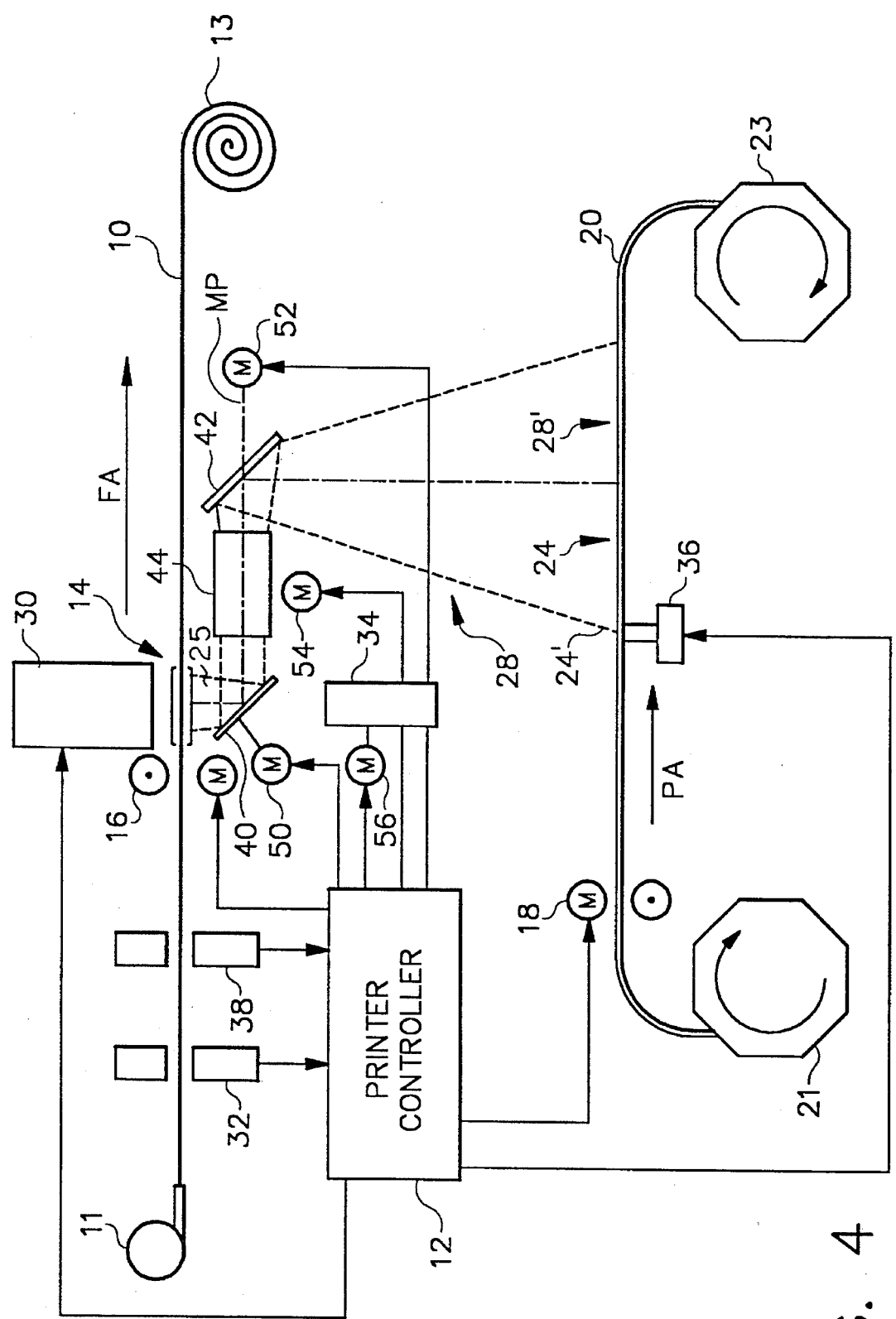
FIG. 4 is a diagrammatic view of the printer of FIG. 2 in the operating position for printing P format filmstrip image frames.

Referring now to FIGS. 2–4, they display certain of the components of an automatic negative filmstrip printer that is modified in accordance with a preferred embodiment of the invention to print first or N format and second or P format image frames on adjacent sections of a photographic print paper of a selected width. The printer may be operated to print the image frames in the sequence in which they appear in the negative filmstrip or to print all of the first or N format image frames in a first pass through the exposure gate and to then print the remaining second or P format image frames in a second pass of the filmstrip through the exposure gate. The printer of FIGS. 2–4 may be similar to the KODAK® CLAS 35 automatic color printer but having modifications including the addition of the components and operations identified hereafter for determining if the image frame to be printed in the printer exposure gate is of the first or second format, advancing the photographic print paper a selected distance into a first or second format projection plane, respectively, and either projecting the light image in a first projection path through a first zoom lens system or a second projection path through a second zoom lens assembly onto the respective first or second format projection plane. In addition, paper masks and paper punches are described below for facilitating projection on the proper projection frame and marking print boundaries.

The CLAS 35 printer accommodates print paper of up to three different widths in paper supply and take-up cassettes mounted in sets of three such cassettes on paper supply and take-up turrets. The desired width of the elongated photographic print paper may be selected and installed in an appropriately sized supply and take-up cassette. The desired paper width supply and take-up cassette on the carousals may be selected through the touch screen user interface. Then, the magnification afforded by the zoom projection lens is adjusted to conform to the selected paper width.

As described below, such a printer as the CLAS 35 automatic color printer is modified in accordance with a second aspect of the invention by the addition of components and operations for adjusting the first and second format image frame zoom lens magnifications to the width of the print paper employed. After such adjustment, the first and second format projection planes are aligned to the width of the selected photographic print paper, and the first and second projection plane length boundaries substantially coincide without any overlap.

In FIGS. 2–4, the printer of one preferred embodiment of the present invention includes a printer controller 12 which operates through stored instructions to control the printing operations for printing image frames of the negative filmstrip 10 advanced into exposure gate 14 through either first or second projection systems onto either projection planes 22 or 24 of the print paper 20 through either the first or second projection paths 26 or 28, respectively. FIG. 2 depicts all of the components of the invention in relative position without regard to the operation of either the first or second projection systems. FIG. 3 depicts the operation of the first or N projection system for printing first or N format image frames. FIG. 4 depicts the operation of the second or P projection system for printing second or P format image frames.

The printer controller 12 controls the operation of the filmstrip advance motor assembly 16 and the paper advance motor assembly 18 as well as the lamphouse and print integrator assembly 30 in a fashion well known in the automatic printer art, except as described hereafter. The printer controller 12 operates and receives red, green and blue color density data for each advanced image frame from a color linear array scanner 32 or the like. The data is employed in controlling the exposure time and color balance of the lamphouse and print integrator assembly 30, thereby determining how the image frame is to be printed when it is advanced into the exposure gate 14, in a manner implemented in the CLAS 35 printer. The printer controller 12 also receives signals input from the operator on a touch screen, a keyboard or through manually operated switches (not shown) and receives signals from filmstrip splice and notch detectors (not shown) to perform a variety of operations not material to the present invention.

Figure 1:
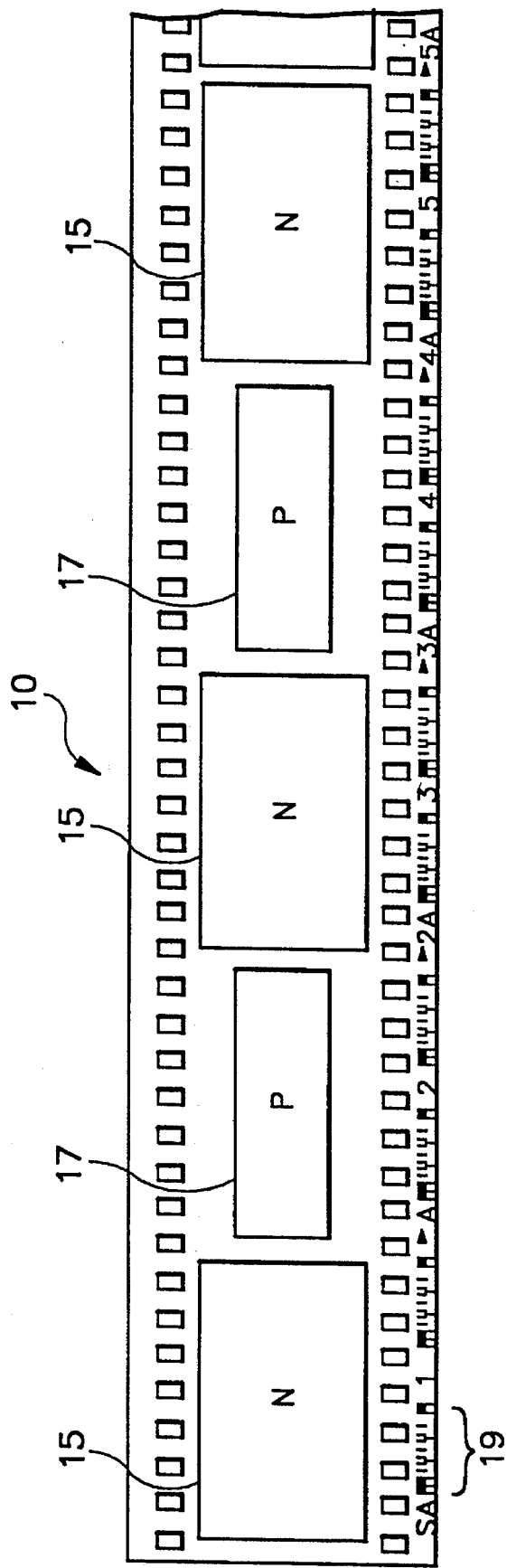
FIG. 1 is a view of a photographic filmstrip exposed with N and P format image frames.

The printer controller 12 also receives data derived from the DX bar code blocks 19 appearing on the filmstrip 10 depicted in FIG. 1 by a filmstrip data reader 38. Such DX bar code blocks 19 are exposed as latent images during manufacture of the filmstrips to provide data related to the film characteristics. Typically, such data is read out and employed by the printer is controlling the print exposure time in a manner well known in the art. Such information is in itself of no use in carrying out the present invention. However, the filmstrip data reader may be employed in accordance with the present invention to distinguish first or N and second or P format image frames as follows.

It is contemplated that future photographic cameras will have a recording capability for recording data related to each exposure on the filmstrip 10. Such cameras may also have the feature of photographing in various formats, including the P and N formats or in a single format but with a designation as to how the image frame is to be printed. In using such cameras, the photographer would select the format, and the exposure would be made through the same or a different lens system as the normal format. For example, in selecting a P format, the image frame format itself may or may not change (i.e., may not be foreshortened as shown in the P format image frame 17 of FIG. 1) from that of the N format. However, the normal lens magnification could be automatically increased when a panoramic view is selected (resulting in a "pseudo-pan" image).

As the exposure is made, the format data would be recorded by latent image bar code recording along the frame edge on standard negative filmstrip. Or, such data would be recorded on a magnetic media strip along the edge of the filmstrip or on the film cartridge. In any case, such data would be read out by the printer and used to make a panoramic print exposure from the pseudo-pan image frame. For example, the image frame could be masked in the upper and lower areas and the foreshortened central area of the image frame could be magnified to emulate the effect of masking the image frame in the camera itself.

Filmstrip data reader 38 in FIGS. 2–4, therefore may be a bar code reader for reading the developed latent image bar code or a magnetic read head for reading magnetically recorded information on a magnetic stripe on the filmstrip or on the film cartridge. Other forms of data recording in memory ICs or the like associated with the filmstrip and/or cartridge are also contemplated that could be read out by the filmstrip data reader 38. Such recorded data would include the designation of the image frame as exposed in the first or N format or as the second or P format in addition to information as to the other exposure conditions.

From this data, however recorded and read out, the printer controller 12 can determine the format of the print to be made from the image frame. As described below in greater detail, an alternative method may be employed by the printer controller 12 to determine the format of the negative filmstrip image frame from the data derived by the scanner 32 scanning the image frames of the first or N and second or P format image frames.

Returning to the general characteristics and operation of the printer of FIGS. 2–4, the printer controller 12 operates a filmstrip transport means for advancing filmstrip image frames through a film transport path. The printer controller 12 drives the filmstrip advance motor assembly 16 to advance or transport each image frame of the filmstrip 10 from the supply reel or thrust type film cartridge 11 in the filmstrip advance direction of the arrow FA through the scanner 32, an illuminated viewing station (not shown) for visual inspection of the negative, the exposure gate 14, past the other, not illustrated detectors and readers, and onto a take-up reel 13.

In the exposure gate 14, a command from the printer controller 12 operates a film clamp and edge flattener to hold the image frame flat during exposure to the source of illumination provided by the lamphouse and print integrator assembly 30. The film clamp and edge flattener in the exposure gate 14 is dimensioned such that its borders mask the exposed image frame on the filmstrip to ensure that an image frame region slightly smaller than the exposed image frame area may be imaged by the first and second zoom lens projection systems described below. The printer controller 12 opens a shutter in the lamphouse and print integrator assembly 30 to project light through the image frame in the exposure gate 14 for an exposure time calculated in a manner well known in the art.

The projected light through the clamped image frame forms an image bearing light beam 25 that is normally projected by a first or N projection system or means. The light image or image bearing beam 25 is normally directed in the first or N projection path 26 through the first or normal projection zoom lens system 34, as depicted in operation in FIG. 3, onto the first or N projection plane 22. The projected light image 25 is magnified to a selected magnification related to the width of the print paper 20 and focused by the first zoom lens system 34 onto the first projection plane 22 to expose the print paper 20 to the magnified light image. The selected magnification is in both the length and width dimensions of the print paper 20 and magnifies the image bearing light beam so that its width spills slightly over the sides of the print paper and its length falls on a paper plane mask (not shown) that is positioned to limit the length of the first projection plane 22. Typically, such a mask is shaped with a rectangular opening that defines the length of the exposed print.

The selected magnification afforded by the first zoom lens system 34 is adjusted or otherwise set by the printer controller 12 operating a first zoom lens motor 56 coupled to adjust the magnification afforded by the first zoom lens 34. The first zoom lens motor 56 may include position sensors for providing position feedback and status signals to the printer controller 12 to assure attainment of the proper magnification. The motor drive control signals and position settings for each selected width paper may be stored in the printer controller and employed when the paper width is changed and entered by the operator. The position status signals may be periodically checked by the printer controller operating system.

In order to print the second or P image frames in accordance with the present invention, the printer of FIGS. 2-4 includes the second projection system means for projecting the second or panoramic image bearing light beam 25 in the second projection path 28 onto the second projection plane 24 as shown specifically in FIG. 4. The second projection system includes the first and second, movable reflective mirrors 40 and 42 and the second zoom lens 44 in and forming the second projection path 28 to reflect and project the image bearing light beam 25 passing through the second or P format images onto the second projection plane 24.

The first reflective mirror 40 is coupled to a mirror positioning motor 50 that is operated by the printer controller 12 to position mirror 40 into the image bearing light beam 25 as shown in FIG. 4 or to move it out of the image bearing light beam 25 as shown in FIG. 3. The planar mirror 40 may be mounted to a carriage (not shown) of the type disclosed in the above referenced '378 patent, incorporated herein by reference, to move in a motion vector extending into and out of the plane of the paper between the two positions. Position sensors may be incorporated with the motor 50 to provide position status signals to the printer controller 12 that may be checked in each print cycle to allow printing of either format image frame to proceed. In this manner, mirror positioning motor 50 and controller 12 function as means for positioning first reflecting mirror 40 in one of the two positions.

Whenever the image frame positioned in the exposure gate 14 to be printed is a previously detected second or P format image frame, the printer controller checks the position of first mirror 40. If necessary, printer controller 12 operates the motor 50 and associated carriage to position the mirror 40 to intercept and reflect the image bearing light beam 25 in the manner depicted in FIG. 4. Similarly, whenever the image frame positioned in the exposure gate 14 to be printed is a previously detected first or N format image frame, the printer controller 12 checks the mirror 40 position status and operates the motor 50 and associated carriage to position the mirror outside the first projection path 26 in the manner depicted in FIG. 3.

In FIG. 4, the image bearing light beam 25 is reflected by the first movable mirror 40 into the second projection path 28 and to the second zoom lens system 44. The magnified image bearing light beam is then reflected by the second reflective mirror 42 onto the second or P format projection plane 24. The second movable mirror 42 is movable back and forth in the plane of FIGS. 2-4 in the direction of arrow MP into positions appropriate to the widths and lengths of the second projection plane 24 for each paper selected width. The movement of the second reflective mirror 42 is effected by a mirror position adjusting means, e.g., by drive signals applied to the further mirror motor 52 and carriage (not shown) provided by printer controller 12 only when a new paper width is selected. Again, the mirror motor 52 may incorporate position sensor, that provide feedback to the printer controller 12 to confirm proper position. In this manner, mirror positioning motor 52 and controller 12 function as means for adjusting position of the second reflective mirror 42 in a proper position for adjusting the length of the second format projection path depending on the photographic paper 20 width and the corresponding adjusted magnification of the second zoom lens system 44 as described below.

The second zoom lens system 44 is itself coupled to a second zoom lens motor 54 that is operated by the printer controller 12 to adust or otherwise set the magnification of the second zoom lens system 44 to that magnification appropriate to the selected print paper width. As described below, this operation is only done on change in paper width. The adjusted magnification is in both the length and width dimensions of the selected print paper 20 and falls within a second mask (not shown) that is positioned to bound the second projection plane 24 when the print paper width is selected.

In accordance with the preferred embodiment of the present invention, the first projection plane 22 may be totally masked by a movable mask during printing exposure of the print paper in the second projection plane 24. Similarly a mask may be provided that is moved in to mask the second projection plane 24 when a print exposure is made in the first projection plane. The masks may be a single plate, long and wide enough to cover the second or P format projection plane 24 when it is at the maximum paper width, mounted on a carriage to move laterally along the length of the print paper 20 until one end or the other is at the adjacent length boundaries of the first and second projection planes. Such a mask carrier could carry paper punches 36 at each end and position the punch to be used at the print boundaries. The carriage movement and lateral positioning of the paper punches may be automatically adjusted to the new adjacent length boundaries accompanying change in paper width as described hereafter.

The first and second projection planes 22, 24 and associated masks (if present) are thus separated lengthwise along the paper transport path. The projection planes thus define adjacent length boundaries with the paper edge punch 36 positioned between the adjacent boundaries. The relative lengths and positions of the first and second projection planes 22, 24, as well as the position of the paper edge punch 36, vary with the size of the print paper employed.

In order to select between the first and second projection systems, it is necessary that the printer controller 12 be able to judge or distinguish first or N and second or P format image frames operating as one of several possible means for determining the image frame format. In accordance with one preferred printing method of the present invention, the printer controller 12 analyzes the image frame color density data derived by the scanner 32 and stored in memory to locate foreshortened image frame borders of the type shown in the P format image frames of FIG. 1. A simple comparison of the red, green and blue color densities of each scanning line against those of the adjacent lines and/or to the unexposed film base reference densities readily identifies foreshortened borders by the repeating pattern in each scan line data set. When foreshortened image frames are so identified, the printer controller 12 classifies the scanned negative image frame as a second or P format image frame. Such a system and method that may be used in this embodiment of the present invention is disclosed in commonly assigned, U.S. Pat. No. 5,289,229, incorporated herein by reference. In this manner, the controller 12 determines in this first embodiment if an image frame of the negative filmstrip 10 in the film transport path to be printed in the printer exposure gate 14 is of the first or N format or of a second or P format.

In accordance with a second preferred embodiment, the printer controller filmstrip data reader 38 reads out the image frame data recorded in future cameras and filmstrip types in one of the methods described above. The read out data identifying the image frame format is employed by the printer controller 12 to classify the image frame and select the projection path as described hereafter. In this manner, the controller 12 determines in this second embodiment if an image frame of the negative filmstrip 10 in the film transport path to be printed in the printer exposure gate 14 is of the first or N format or of a second or P format.

In a printer not having a scanner 32 and filmstrip data reader 38, the image frames may also be viewed by the operator as they are advanced into a view window who then determines in this variation if an image frame of the negative filmstrip 10 in the film transport path to be printed in the printer exposure gate 14 is of the first or N format or of a second or P format. At least the foreshortened image frames may be readily identified by the operator, and the printer may be instructed to select the second projection system. Even the fully automated color printer of the present invention would retain the view window and optional manual controls for viewing, advancing and printing individual image frames of a filmstrip.

Each time an identified second or P format image frame is advanced into the exposure gate 14, the printer controller 12 is capable of selectively printing the image frame in the second or P format in sequence with the other image frames on the filmstrip 10. In this operation, printer controller 12 checks the position status of and, if necessary, sends motor drive signals to the first mirror motor 50 to position the mirror 40 into the image bearing light beam 25 thereby operating first mirror motor 50.

Before each first or N and second or P format image frame is printed (which may immediately follow the preceding printing of a first, N, or second, P, image frame), the printer controller 12 operates the photographic paper transport means to transport the paper 20 of the selected width into either the first or second projection plane 22 or 24. The printer controller 12 operates the paper advance drive motor assembly 18 to advance the paper 20 from the supply cassette 21 to the take-up cassette 23 a calibrated distance in the paper advance direction of arrow PA sufficient to position the unexposed print paper in the correct projection plane 22 or 24. The calibrated distance for each paper advance is also sufficient to avoid projection onto previously exposed print paper without leaving excessive separation between exposed prints. The amount of advance is also dependent on the selected paper width, since the magnification of the zoom lens system 34 is set to the paper width and affects the lengths of the first and second projection planes 22, 24.

Once the mirror 40 is properly positioned and the print paper 20 is properly advanced, the lamphouse shutter is opened the requisite exposure time and the image bearing light beam 25 is projected in the first or second projection path 26 or 28 onto the respective projection plane 22 or 24. The number of times that the mirror 40 is positioned into and out of the image bearing light beam 25 depends on the number of second or P format image frames encountered in each negative filmstrip.

To reduce "wear and tear" on the mirror motor 50 and drive carriage of the mirror 40, it may be desirable to print second format image frames non-sequentially. With non-sequential printing, one (or at most two) change(s) of position of mirror 40 would be required per filmstrip. In contrast, with sequential printing, position changes in mirror 40 might be necessary at every image frame. In the preferred embodiment, the printer controller 12 may be configured to advance the previously identified second or P format image frames of each filmstrip past the exposure gate 14 and only print the first or N image frames in a first pass. Then, the filmstrip transport is operated in reverse to back the filmstrip up and then advance each second or P format image frame into the exposure gate to print those image frames in a second pass until the full customer print order is completed. In a less automated printer, the first and second format image frames may be viewed by the operator and appropriate steps may be manually taken to either print all the image frames of each format in the single pass or in two passes.

In either case, after each print is exposed or after paper advance, the printer controller 12 operates paper punch 36 to punch a notch in the print paper edge at the junction between the first and second projection planes 22 and 24 at their adjacent length boundaries. The paper punch 36 is moved laterally with change in paper width to always be at the adjacent projection plane length boundaries.

The above described operations in printing first or N and second or P format image frames on a selected print paper width are without regard to any specific paper width. In these operations, the magnifications of the first and second zoom lens systems 34 and 44 and the position of the second reflecting mirror 42 remain constant. These magnifications and position are only adjusted by the controller 12 operating the first and second zoom lens motors 56 and 54, respectively, and the mirror position motor 52, respectively, along with the change in print paper to a new paper width. As described above, the print paper width change is manually done while changing or adjusting supply and take-up paper cassettes 21, 23, the position of punch 36 and the masks (if present) for the first and second projection planes. The printer controller 12 is informed of the new paper width and responds by adjusting the magnifications of the first and second zoom lens systems 34, 44, by providing motor drive signals to the first and second zoom lens motors 56, 54, and the position MP of second mirror 42 by providing a drive signal to the second mirror motor 52. The printer controller 12 and zoom lens motors 56, 54 therefore constitute magnification adjusting means for adjusting the magnifications of the first and second zoom lens systems 34, 44, and the resulting image frame magnifications. The printer controller 12 also responds by adjusting the the paper advance PA settings for advancing unexposed print paper into both of the projection planes 22 and 24. The lateral movement of the mirror 42 in the direction of arrow MP lengthens or shortens the second projection path 28 and laterally moves the optical center of the projection path 28 lengthwise along the print paper 24. The amount of lateral movement to effect the proper lateral re-positioning to the print paper width is proportional to the adjustment in magnification of the second zoom lens system 44 to conform to the new paper width.

Photo-finishers may also desire to fine tune the magnification to each paper size to ensure that after paper width change over, there is little loss of image or "spillover" in either the width or length dimension, so that most of the projected image is captured on the print paper. In the preferred embodiments of the present invention, the first and second zoom lens systems 34 and 44 are also outfitted with a secondary magnification adjustment to allow for fine tuning of the percentage spillover.

In order to provide the requisite lateral translation of the second projection path as the first and second projection paths and projection planes are changed in length, the second zoom lens system is preferably defined as a PVCC zoom lens system. Such a PVCC zoom lens system differs from the normal zoom lens system that may be employed as the first zoom lens system 34 in that the object plane to image plane distance in focus varies as the zoom magnification is changed in the PVCC zoom lens and is held constant in the normal zoom lens to maintain focus.

Figure 7:
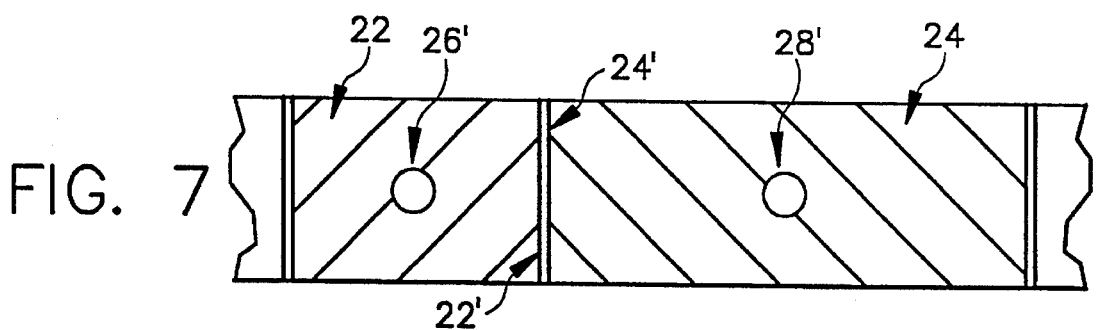
FIGS. 6 and 7 are schematic illustrations of the enlargement of the N and P projection planes to fit photographic print papers of second and third widths, respectively, through further operations of the printer of FIGS. 2–4.
Figure 6:
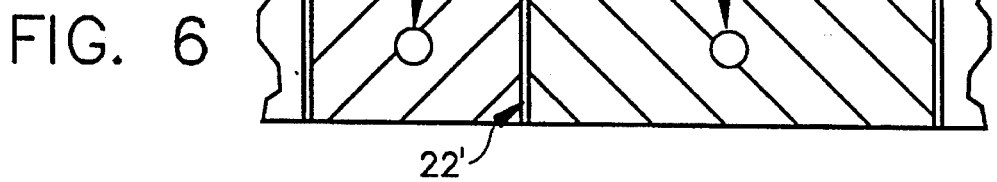
Figure 5:
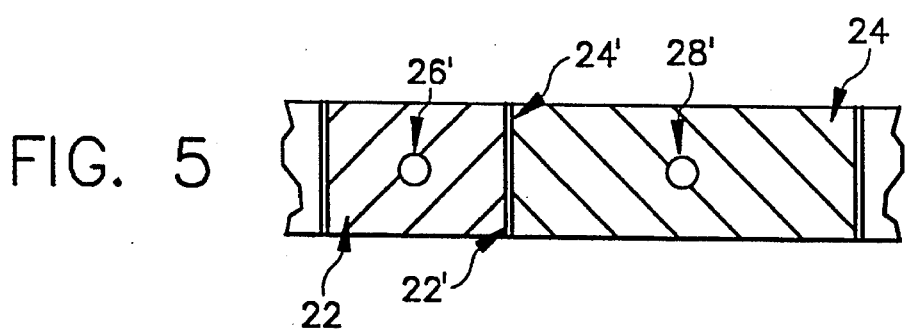
FIG. 5 is a schematic illustration of the positioning of the N and P projection planes on adjacent sections of photographic print paper of a first width in accordance with operation of the printer of FIGS. 2–4.
Figure 8:
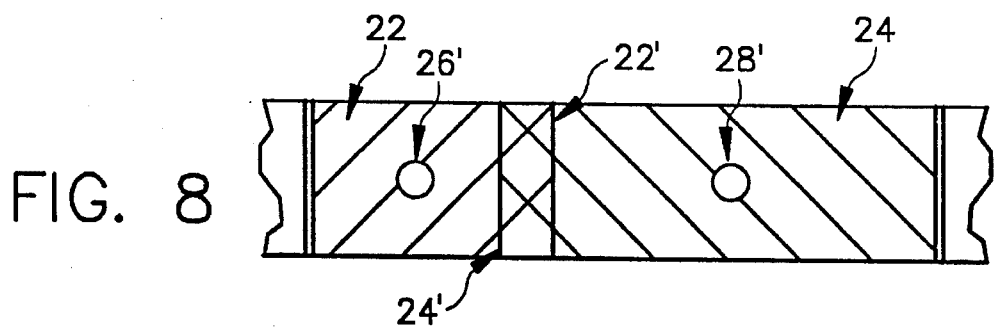
FIG. 8 is a schematic illustration of the enlargement of the N and P projection planes to fit a photographic print paper of the second width employing an unsuitable panoramic projection zoom lens and reflective mirror assembly.

FIGS. 5–7 illustrate the effect of using the PVCC zoom lens as the second zoom lens system 44, whereas FIG. 8 illustrates the effect of using a normal zoom lens as the second zoom lens system 44, both effects observed in the printer of FIGS. 2–4. In FIG. 5, the positions of the first and second projection planes 22 and 24 and the center points 26' and 28' of the projection paths 26 and 28 are illustrated schematically with 3.5 inch width print paper. The adjacent projection plane length boundaries 22' and 24' are separated by a strip which are notched by the edge punch 36, and which are severed after processing to form separate prints. As can be observed from FIGS. 5–7, the second or P format projection plane 24 is displaced entirely in a non-overlapping manner from the first or N format projection plane in the direction of advancement of the photographic print paper at each paper width.

FIGS. 6 and 7 illustrate the magnification of the first and second projection planes to fit 4.0 and 5.0 inch paper widths. The center point 26' of the first projection path 26 remains constant, but the length and width of the first projection plane 22 expands in both directions from center point 26'. The center point 28' of the second projection path 28 moves laterally to accommodate the length expansion of both the first and second projection planes 22 and 24. This lateral movement is accomplished by the lateral movement of the second mirror 42 on the mirror path MP distances proportional to the changes in magnification of both of the first and second zoom lens systems 34 and 44 to maintain the separation of the adjacent length boundaries 22' and 24' at each paper width.

This lateral movement of mirror 42 to avoid overlap of the projection planes 22, 24 can be accomplished with the use of the PVCC zoom lens system, since the object plane to image plane distance in the second projection path 28 changes with the lateral movement. No such change in object plane to image plane distance occurs in the first projection path 26, and therefor the first zoom lens system may be a normal zoom lens with fixed object plane to image plane distance at all magnifications. Stated another way, if a normal zoom lens were selected for the second zoom lens assembly 44, it would not be possible to move the mirror 42 and maintain focus. Instead, overlap of the projection planes 22 and 24 would have to be allowed to maintain focus at all magnifications necessary to fit the print paper width selected.

FIG. 8 illustrates the severity of overlap that would result in increasing the magnification from the 3.5 inch paper width of FIG. 5 to the 4.0 inch paper width using a fixed position mirror and normal zoom lens. With the three paper widths currently employed, one compensating approach would be to fix the distance of the second mirror 42 to afford the maximum distance between the center points 26' and 28' shown in FIG. 7, that is at the distance for the 5.0 inch width paper. Then, as the narrower paper widths are selected, the gaps between the adjacent projection plane boundaries 22' and 24' would widen, wasting print paper. Another approach would be to select the distance for the 4.0 inch width paper and mask the projection plane length boundaries when the 5.0 inch width paper were used. Photo-finishers are loath to waste print paper, and would likely not follow these approaches.

Instead, it would be necessary to add incremental print paper re-positioning steps whenever the format of the image frame to be printed is different than that of the preceding image frame a distance equal to the overlap. Moreover, either the paper punch 36 would have to be moved along with the repositioned paper length boundary or more than one punch would have to be provided, since the position of the adjacent image frame length boundaries 22', 24' would change each time the format changes.

By contrast, the use of the PVCC zoom lens allows the print paper to be advanced simply and in any sequence of P and N format image frames to be printed. The following example considers the operation of printing the sequence of P and N format image frames appearing in FIG. 1 in a single pass. Following exposure of a P format image frame and as an N format image frame is advanced into the exposure gate 14 to be printed, the controller 12 moves and confirms the position of mirror 40 out of the first projection path. The print paper 20 is already in position in the first projection plane 22, since it was previously advanced to the second projection plane 24. A panoramic printing plane mask (not shown), if present, may be automatically moved into position over the previously exposed panoramic image in the second projection plane. At the same time, a normal printing plane mask (not shown), if present, may be moved out of the way from the first projection plane. The shutter is opened by a command of the printer controller 12 to expose the N format image in the printing plane 22. The paper punch 36 is then operated by the printer controller 12 to form the notch at the adjoining length boundaries of the two exposed prints.

Following exposure of this N format image frame, and at the advance of a P format image frame into the exposure gate 14, the printer controller 12 advances the print paper the full lengths of the projection planes 22 and 24 to position un-exposed paper into the second projection plane 24. The printer controller 12 switches the positions of the masks (if present), moves the mirror 40 into the position of FIG. 4, makes the exposure, and operates the paper punch 36. No adjustment of paper and paper punch position is necessary.

If the next image frame advanced into exposure gate 14 is of the N format, the printing paper 20 is already positioned to make the next N format exposure upon removal of mirror 40 and switching mask positions. If the next image frame advanced is the P format, then the print paper 20 need only be advanced to position the un-exposed paper in the second printing plane 24.

The preferred embodiment of the present invention thus permits the lens design to take advantage of a longer overall object plane to image plane distance to keep the field coverage of the second, PVCC zoom lens system to a minimum while at the same time reducing the number of different masking and punching positions required at the paper plane. The weight and position tolerances of the parts required to change magnification are kept to a minimum. Locations of paper punches and paper masks are conveniently placed in the system through the use of the PVCC zoom lens.

As described briefly above, should cameras be developed to take other than normal format image frames in a normal image frame format (e.g., the pseudo-pan format described above), the PVCC zoom lens magnification may be adjusted to the magnification desired. In the pseudo-pan context, the entire image frame may be magnified and projected toward the second projection plane 24. However the upper and lower image frame areas projected may spill over the sides of the paper in the projection plane 24, thereby achieving the P format in the print.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention, particularly any and all equivalents to any of the limitations expressed therein as are presently known or may become known to those of ordinary skill in the art.

PARTS LIST FOR FIGS. 1–8 filmstrip 10
filmstrip supply reel or thrust cartridge 11
printer controller 12
filmstrip take-up reel 13
exposure gate 14
N format image frame 15
filmstrip drive assembly 16
P format image frame 17
paper drive assembly 18
DX bar code block 19
print paper 20
paper supply cassette 21
first projection plane 22
first projection plane length boundary 22'
paper take-up cassette 23
second projection plane 24
second projection plane length boundary 24'
first or N projection path 26
first projection center point 26'
second or P projection path 28
second projection point 28'
lamphouse and print integrator assembly 30
color linear array scanner 32
first or N format zoom lens system 34
paper edge punch 36
filmstrip data reader 38
first reflective mirror 40
second reflective mirror 42
second or P format zoom lens system 44
first mirror motor 50
second mirror motor 52
second zoom lens system motor 54
first zoom lens system motor 56

We claim:

1. A method of printing first and second format image frames from a negative filmstrip onto elongated, continuous, photographic print paper having a selected width at magnifications related to the selected paper width comprising the steps of:

advancing a negative filmstrip having first or second format image frames in a film transport path including an exposure gate for supporting a filmstrip image frame to be printed and a light source for projecting light through an image frame in the exposure gate to provide an image bearing light beam;

determining if an image frame of said negative filmstrip in said transport path to be printed in said printer exposure gate is of said first or second format;

upon determining that said image frame is of said first format:

advancing in a paper advance direction and positioning a first unexposed length of said elongated, continuous, photographic print paper in a first format projection plane centered with respect to a first format projection path, said first format projection plane having a width corresponding to the selected paper width and a first format projection plane length;

operating said light source to project light through the first format image frame in said exposure gate to provide a first format image bearing light beam;

focusing and magnifying said first format image bearing light beam in said first format projection path, at a selected first format image frame magnification related to the selected paper width, onto said photographic print paper in said first format projection plane, thereby defining a first format, projection plane length boundary at said selected first image frame magnification; and upon determining that the image frame is of said second format:

advancing in said paper advance direction and positioning a second unexposed length of said elongated, continuous, photographic print paper in a second format projection plane displaced, in the paper advance direction, entirely in a non-overlapping manner from said first format projection plane, said second format projection plane centered with respect to a second format projection path and having a width corresponding to the selected paper width and a second format projection plane length;

positioning a second format, adjustable magnification, optical system with respect to said image bearing light beam to project a second format image bearing light beam in said second format projection path; and operating said light source to project light through the second format image frame in said exposure gate to provide said second format image bearing light beam for projection through said second format optical system and through said second format projection path onto said photographic print paper in said second format projection plane, displaced apart from said first format projection plane, at a selected second image frame magnification related to the selected paper width, thereby defining a second format, projection plane length boundary at said selected second image frame magnification substantially coinciding with said first format, projection plane length boundary.

2. The method of claim 1 further comprising the steps of:

selecting the width of the elongated, continuous, photographic print paper; and adjusting said first and second format image frame magnifications so that said first and second format projection planes are aligned in width to the selected paper width and so that said first and second format, projection plane length boundaries substantially coincide and said first and second projection planes do not overlap in the direction of transport of said photographic print paper.

3. The method of claim 1 wherein said step of positioning a second format, adjustable magnification, optical system with respect to said image bearing light beam further comprises the steps of:

selectively positioning a first reflective mirror in relation to said first format projection path to reflect said second format image bearing light beam into said second format projection path;

positioning an adjustable magnification zoom lens system in said second format projection path for selectively magnifying said second format light image in said second format projection path; and positioning a second reflective mirror in said second format projection path in relation to said adjustable magnification zoom lens system for reflecting said magnified light image onto said second projection plane; and further comprising the steps of:

adjusting the magnification of said zoom lens system in said second format projection path for selectively magnifying said second format light image to said selected paper width; and adjusting the position of said second reflective mirror in said second format projection path for adjusting the length of said second format projection path to maintain said first and second format projection plane length boundaries in substantial coincidence.

4. The method of claim 3 wherein said focusing and magnifying step further comprises:

positioning an adjustable magnification zoom lens system in said first format projection path for selectively focusing and magnifying said projected light image onto said first format projection plane; and further comprising the step of:

adjusting the magnification of said zoom lens system in said first format projection path for selectively magnifying the width of said first format light image to said selected paper width.

5. The method of claim 4 wherein said step of positioning an adjustable magnification zoom lens system in said second format projection path for selectively magnifying said second format light image further comprises the step of:

providing an adjustable magnification precision variable conjugate controlled zoom lens in said second format projection path to provide focused image magnification with adjustment of the position of said second reflective mirror in said second format projection path altering the position of said second format projection plane along the length of said photographic print paper.

6. The method of claim 3 wherein said step of positioning an adjustable magnification zoom lens system in said second format projection path for selectively magnifying said projected light image further comprises the step of:

providing an adjustable magnification precision variable conjugate controlled zoom lens in said second format projection path to provide focused image magnification with adjustment of the position of said second reflective mirror in said second format projection path altering the position of said second projection plane along the length of said photographic print paper.

7. The method of claim 1 wherein said focusing and magnifying step further comprises:

positioning an adjustable magnification zoom lens system in said first format projection path for selectively focusing and magnifying said projected light image onto said first format projection plane; and further comprising the step of:

adjusting the magnification of said zoom lens system in said first format projection path for selectively magnifying the width of said first format light image to said selected paper width.

8. Apparatus for printing first and second format image frames from a negative filmstrip onto elongated, continuous, photographic print paper having a selected paper width at selected magnifications related to the selected width comprising:

a printer exposure gate for supporting a filmstrip image frame to be printed and a light source for projecting light through an image frame in said exposure gate to provide an image bearing light beam;

filmstrip transport means for advancing the negative filmstrip into said printer exposure gate;

means for determining if an image frame in said filmstrip transport means is of the first or second format;

means for advancing an unexposed length of the elongated, continuous, photographic print paper in a print advancement direction into a first format projection plane or into a second format projection plane, depending on the determined format of the image frame to be printed, said first and second format projection planes being displaced apart along the print advancement direction, said first format projection plane having a first length and a width corresponding to said selected paper width and centered with respect to a first projection path, said second format projection plane having a second length and a width corresponding to said selected paper width and centered with respect to a second projection path, said first and second format projection planes having adjacent first format and second format, projection plane length boundaries;

a first format, adjustable magnification, light image projection system;

means operable upon determining that said image frame is of said first format for operating said light source to project said image bearing light beam through said first format projection system as a first projected light image in said first projection path for focusing and magnifying said first projected light image, at a first format image frame magnification related to the selected paper width, onto said photographic print paper in said first format projection plane;

a second format, adjustable magnification, light image projection system; and means operable upon determining that said image frame is of said second format for operating said light source and for projecting said image bearing light beam through said second format, adjustable magnification, light image projection system as a second projected light image in said second projection path and onto said photographic print paper in said second format projection plane, at a selected second image frame magnification related to the selected paper width.

9. The apparatus of claim 8 further comprising:

magnification adjusting means for adjusting the magnifications of said first and second format light image projection systems so that said first and second format projection planes are aligned to said selected paper width; and length adjusting means for adjusting the relative lengths of said first and second projection paths such that said first and second projection planes do not overlap one another and have first and second format, projection plane length boundaries that substantially coincide.

10. The apparatus of claim 9 wherein:

said second format, adjustable magnification, light image projection system further comprises:

a first reflective mirror selectively positionable in relation to said printer exposure gate to reflect said image bearing light beam into said second projection path;

an adjustable magnification zoom lens system in said second projection path for projecting said image bearing light beam as a magnified light image in said second projection path;

an adjustable second reflective mirror positioned in said second projection path in relation to said adjustable magnification zoom lens system for reflecting said magnified light image onto said second projection plane;

said magnification adjusting means further comprises means for adjusting the magnification of said zoom lens system in said second projection path for selectively magnifying said projected light image to said selected photographic print paper width; and said length adjusting means further comprises means for adjusting the position of said second reflective mirror in said second projection path for adjusting the length of said second projection path to maintain said first and second format projection plane length boundaries in substantial coincidence.

11. The apparatus of claim 10 wherein said adjustable magnification zoom lens system in said second projection path further comprises:

an adjustable magnification, precision variable conjugate controlled zoom lens positioned in said second projection path to provide focused image magnification with adjustment of the position of said second reflective mirror in said second projection path altering the position of said second projection plane along the length of said photographic print paper by said length adjusting means.

12. The apparatus of claim 9 wherein:

said first format, adjustable magnification, light image projection system further comprises an adjustable magnification zoom lens system positioned in said first projection path for projecting said image bearing light beam as a magnified light image onto said first projection plane; and said magnification adjusting means further comprises means for adjusting the magnification of said zoom lens system positioned in said first projection path for selectively magnifying the width of said magnified light image to said selected photographic print paper width.

13. The apparatus of claim 12 wherein said adjustable magnification zoom lens system in said second projection path further comprises:

an adjustable magnification, precision variable conjugate controlled zoom lens positioned in said second projection path to provide focused image magnification with adjustment of the position of said second reflective mirror in said second projection path altering the position of said second projection plane along the length of said photographic print paper by said length adjusting means.

14. The apparatus of claim 13 wherein:

said first format, adjustable magnification, light image projection system further comprises an adjustable magnification, precision variable conjugate zoom lens system positioned in said first projection path for projecting said image bearing light beam as a magnified light image onto said first projection plane; and said magnification adjusting means further comprises means for adjusting the magnification of said zoom lens system positioned in said first projection path for selectively magnifying the width of said magnified light image to said selected paper width.

15. The apparatus of claim 14 wherein said first format image frame is a normal format image frame and said second format image frame is a panoramic format image frame.

16. The apparatus of claim 9 wherein said first format image frame is a normal format image frame and said second format image frame is a panoramic format image frame.

17. A photographic printer for selectively exposing prints on elongated, continuous, photographic paper having a selected paper width from photographic filmstrip image frames having first or second image frame widths at selected magnifications related to the selected paper width comprising:

a photographic filmstrip transport for advancing filmstrip image frames;

an exposure gate for supporting a filmstrip image frame to be printed;

a source of illumination for projecting light through the image frame in the exposure gate to form an image bearing light beam;

a photographic paper transport for transporting elongated photographic print paper of a selected paper width into a first projection plane or into a second projection plane, said first and second projection planes displaced apart along the length and direction of transport of said photographic print paper;

a first zoom lens system for projecting said image bearing light beam at a first magnification related to the selected paper width and the first image frame width onto said photographic print paper in said first projection plane and thereby defining a length boundary of said first projection plane at said selected first magnification related to said first image frame width and the selected paper width;

a first reflective mirror selectively interposable between said exposure gate and said first zoom lens system for selectively reflecting said image bearing light beam away from said first zoom lens system into a second projection path;

a second zoom lens system for projecting said image bearing light beam reflected by said first reflective mirror at a second magnification related to the selected paper width and said second image frame width;

a second reflective mirror interposed between said second zoom lens system and said photographic print paper for reflecting said image bearing light beam onto said second projection plane at said second magnification; and means for selectively positioning said second reflective mirror with respect to said second zoom lens system for displacing said second projection plane with respect to said first projection plane along the length of said photographic print paper and thereby defining a length boundary of said second projection plane and substantially aligned with said length boundary of said first projection plane at said selected first and second magnifications.

18. The printer of claim 17 wherein:

said second zoom lens system in said second projection path further comprises an adjustable magnification, precision variable conjugate controlled zoom lens positioned in said second projection path; and said positioning means further comprises means for adjusting the position of said second reflective mirror in said second projection path and for altering the displacement of said second projection plane along the length of said photographic print paper.

19. A method of printing normal format and panoramic format image frames from a negative filmstrip onto elongated, continuous, photographic paper having a selected paper width at magnifications related to the selected paper width comprising the steps of:

advancing a negative filmstrip having normal format or panoramic format image frames in a film transport path including an exposure gate for supporting a filmstrip image frame to be printed and a light source for projecting light through an image frame in said exposure gate to provide an image bearing light beam;

determining if an image frame of said negative filmstrip in said transport path to be printed in said printer exposure gate is of a normal or a panoramic format;

upon determining that said image frame is a normal image format:

advancing in a paper advance direction and positioning a first unexposed length of said elongated photographic print paper in a normal format projection plane centered with respect to a normal projection path, said normal format projection plane having a width corresponding to the selected paper width and a normal format projection plane length;

operating said light source to project light through the normal format image frame in said exposure gate to provide a normal image bearing light beam; and focusing and magnifying said normal image bearing light beam at a selected normal format image frame magnification related to the selected paper width onto said photographic print paper in said normal format projection plane, thereby defining a normal format, projection plane length boundary at said selected normal image frame magnification; and upon determining that said image frame is a panoramic image format:

advancing in said paper advance direction and positioning a second unexposed length of said elongated, continuous, photographic print paper in a panoramic format projection plane displaced entirely in a non-overlapping manner from said normal format projection plane in the paper advance direction, said panoramic format projection plane centered with respect to a panoramic projection path and having a width corresponding to the selected paper width and a panoramic format projection plane length;

positioning a panoramic image frame optical system to magnify and focus a panoramic image bearing light beam in said panoramic projection path onto said panoramic format projection plane; and operating said light source to project light through the panoramic format image frame in said exposure gate to provide said panoramic image bearing light beam focused through said panoramic image frame optical system at a selected panoramic image frame magnification related to the selected paper width and onto said photographic paper in said panoramic format projection plane, thereby defining a panoramic format, projection plane length boundary at said selected panoramic image frame magnification substantially coinciding with said normal format, projection plane length boundary.

20. The method of claim 19 further comprising the steps of:

selecting the width of the elongated photographic print paper; and adjusting said normal and panoramic format image frame magnifications so that said normal and panoramic format projection planes are aligned in width to the selected paper width and so that said normal and panoramic format, projection plane length boundaries substantially coincide and said normal and panoramic projection planes do not overlap in the direction of transport of said photographic print paper.

21. The method of claim 19 wherein said step of positioning a panoramic format, adjustable magnification, optical system with respect to said image bearing light beam further comprises the steps of:

selectively positioning a first reflective mirror into said panoramic image bearing light beam to reflect said panoramic image bearing light beam into said panoramic projection path;

positioning an adjustable magnification zoom lens system in said panoramic projection path for selectively magnifying said projected panoramic light image in said panoramic projection path;

positioning a second reflective mirror in said panoramic projection path in relation to said adjustable magnification zoom lens system for reflecting said magnified light image onto said panoramic projection plane; and further comprising the steps of:

adjusting the magnification of said zoom lens system in said panoramic projection path for selectively magnifying said reflected light image to said selected photographic print paper width; and adjusting the position of said second reflective mirror in said panoramic projection path for adjusting the length of said panoramic projection path to maintain said normal and panoramic format projection plane length boundaries in substantial coincidence.

22. The method of claim 21 wherein said focusing and magnifying step further comprises:

positioning an adjustable magnification zoom lens system in said normal projection path for selectively focusing and magnifying said projected normal light image of said normal format image frame onto said first projection plane; and further comprising the step of:

adjusting the magnification of said zoom lens system in said normal projection path for selectively magnifying the width of said projected light image of said normal format image frame to said selected photographic print paper width.

23. The method of claim 22 wherein said step of positioning an adjustable magnification zoom lens system in said panoramic projection path for selectively magnifying said projected light image further comprises the step of:

providing an adjustable magnification, precision variable conjugate controlled zoom lens in said panoramic projection path to provide focused image magnification with adjustment of the position of said second reflective mirror in said panoramic projection path altering the position of said panoramic projection plane along the length of said photographic print paper.

24. The method of claim 21 wherein said step of positioning an adjustable magnification zoom lens system in said panoramic projection path for selectively magnifying said projected light image further comprises the step of:

providing an adjustable magnification, precision variable conjugate controlled zoom lens in said panoramic projection path to provide focused image magnification with adjustment of the position of said second reflective mirror in said panoramic projection path altering the position of said panoramic projection plane along the length of said photographic print paper.

* * * * *